(12) United States Patent
Bloom

(10) Patent No.: US 7,994,107 B2
(45) Date of Patent: Aug. 9, 2011

(54) LUBRICANT ADDITIVES

(75) Inventor: Paul Bloom, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 12/936,271

(22) PCT Filed: Apr. 28, 2009

(86) PCT No.: PCT/US2009/041939
§ 371 (c)(1),
(2), (4) Date: Oct. 4, 2010

(87) PCT Pub. No.: WO2009/137298
PCT Pub. Date: Nov. 12, 2009

(65) Prior Publication Data
US 2011/0039742 A1  Feb. 17, 2011

Related U.S. Application Data

(60) Provisional application No. 61/050,776, filed on May 6, 2008.

(51) Int. Cl.
*C10M 105/32* (2006.01)
*C10M 145/22* (2006.01)
*C07C 69/22* (2006.01)

(52) U.S. Cl. .................... 508/496; 554/174; 524/313

(58) Field of Classification Search .................. 508/496; 554/174; 524/313
See application file for complete search history.

(56) References Cited

U.S. PATENT DOCUMENTS

| 5,043,485 | A | * | 8/1991 | Fleckenstein et al. | ........ 568/885 |
| 5,885,946 | A | | 3/1999 | Lamsa | |
| 6,278,006 | B1 | | 8/2001 | Kodali et al. | |
| 6,476,081 | B1 | * | 11/2002 | Hillion et al. | ................ 516/15 |
| 7,842,746 | B2 | * | 11/2010 | Bloom et al. | ................ 524/270 |

FOREIGN PATENT DOCUMENTS

EP  1436369  B1  2/2006

* cited by examiner

*Primary Examiner* — Glenn Caldarola
*Assistant Examiner* — Jim Goloboy
(74) *Attorney, Agent, or Firm* — Scott Bloomer; William B. Miller

(57) ABSTRACT

Processes are described for producing liquid, biobased lubricant additives containing from 50 to 100% biobased carbon according to ASTM D6866 from heat-bodied oils by transesterification with biobased or petroleum based alcohols and by hydrogenation of at least the resulting diesters, triesters and polyesters.

15 Claims, 6 Drawing Sheets

NMR spectrum of hydrogenated heat bodied residue fraction Example 2

Fig. 4 NMR spectrum of Example 8 hydrogenated residue of methyl esters of heat bodied oil (labeled methyl ester-dimer, 4459-195)

Fig. 5  NMR spectrum of Example 9 liquid phase of fractionated hydrogenated methyl esters of heat bodied oil (OKO M2-1/2)

Thermogravimetric analysis trace of Example 18 liquid phase of hydrotreated heat bodied oil (OKO M7-1/2)

LUBRICANT ADDITIVES

CROSS-REFERENCE TO RELATED APPLICATIONS

This application is 35 USC 371 national phase entry of International Application No. PCT/US09/41939, filed Apr. 28, 2009, which itself claims priority to U.S. Provisional Patent Application No. 61/050,776, filed May 6, 2008, each of the contents of the entirety of which are incorporated by this reference.

The present invention relates generally to biobased oils and more particularly biobased oils subjected to transesterification and separated to form compositions suitable for use as lubricant additives.

Lubricants are essential components of many industrial processes in which two or more surfaces move in close contact. The range of principle applications for lubrication oils is very broad, and includes, without limitation, automotive lubricants, lubricants for two-stroke and four-stroke gasoline engines, lubricants for diesel engines, gas engine oils, gas turbine oils, automatic transmission fluids, gear oils, etc. Industrial lubricating oils include, without limitation, industrial gear oils, pneumatic tool lubrication, high temperature oils, air and gas compressor oils for all types of compressors, machine tool way oils, textile oils, steam turbine oils, hydraulic fluids, paper machine oils, food machinery oils, steam cylinder oils, metalworking fluids for metal cutting, metal rolling, metal drawing, metal forging, and metal stamping.

Finished lubricants (or oils, hereafter) typically have two general components, namely, a lubricating base oil component and an additives component, with the lubricating base oil component being the larger of the two. In practice, a few lubricating base oils are used to manufacture a wide variety of finished lubricants, by using a variety of different combinations of lubricant additives.

Lubricant additives supplement the lubricant's natural characteristics, improve performance, or broaden areas of suitability. Additives can protect the finished lubricant from chemical change or deterioration, protect the machine in which the lubricant is used from harmful substances formed in the fuel or lubricant or from lubricant failure, or improve certain physical properties of the lubricant. Additives increase the dependability of a lubricant and change certain physical characteristics for the better, for example: improving the viscosity-temperature relationship as defined by the temperature-dependent viscosity profile, or reducing the pour point so the lubricant will flow at lower temperatures than its mineral-base component alone; developing a "plating out" effect in the resultant oil film to protect ferrous metals from rusting and bearing metals from corrosion; imparting improved resistance to oxidation, excessive emulsification, varnish and sludge formation as in turbine and hydraulic oils, essential with certain types of gear and bearing surfaces; depressing foam or reducing the tendency of an oil to foam when agitated with air; developing a detergent and dispersive characteristic in the oil; and raising the consistency, or tackiness, characteristics of the oil to prevent excessive leakage.

Additives for lubricants have long been derived from crude petroleum oils, which are complicated mixtures and subject to large variations in composition and quality. Consequently, the quality of additives is very sensitive to the crude oil source and refining processes used. There is a need in the industry for additives which can provide consistent, predictable properties. A consistent raw material source of predictable quality, it will be appreciated, is integral to meeting this need, and as crude oil sources are depleted and different refining processes adapted to process different crudes, it has become increasingly more difficult to provide such a consistent source material.

Crude petroleum oils from which lubricant additives are conventionally derived contain sulfur in the form of soluble organosulfur compounds, at levels as high as greater than 2%. There is additionally a need in the art for a source of additives that is substantially free from sulfur compounds.

Crude petroleum oils also contain molecules bearing nitrogen atoms in their structure. Nitrogen-containing molecules in lubricants can cause deterioration of lubricants and promote oxidation. Even at levels as low as 10 ppm, basic nitrogen compounds can promote oxidative breakdown of lubricants, hydraulic fluids, and turbine oils, resulting in acceleration of onset of oxidation and sludge formation. There is a further need in the art for a source of lubricant additives with reduced nitrogen levels, compared to those obtainable from conventional crude petroleum oils.

For clarity as used herein, the terms "bioderived" and "biobased" equivalently refer to materials which are derived from or originate in biological sources rather than petroleum or petrochemical sources, such as, for example, from agricultural, forestry, plant, bacterial, or animal feedstocks or sources. The present invention is especially directed to materials which derive from or originate in biological products or renewable agricultural materials (including plant, animal and marine materials) or forestry materials. As used herein, the term "petroleum derived" means a product derived from or synthesized from petroleum or a petrochemical feedstock. Standard analytical methods have now been developed for determining the biobased content of a material, per ASTM International Radioisotope Standard Method D 6866. ASTM International Radioisotope Standard Method D 6866 determines the biobased content of a material, based on the amount of biobased carbon in the material as a percent of the weight (mass) of the total organic carbon in the material or product. In particular, biobased products will have 13C/12C and 14C/12C carbon isotope ratios which differ from those found in petroleum derived materials.

The present invention as indicated concerns biobased lubricant additives which address the needs mentioned above, and processes for producing those biobased lubricant additives. According to a first aspect, a process is provided which comprises transesterifying a biobased heat-bodied oil with an alcohol to produce a mixture comprising glycerol, free fatty acids, and a residue comprising monoesters, diesters, triesters, and polyesters. Some or all of the glycerol, the free fatty acids, and the monoesters are in certain embodiments removed from the mixture, whereupon the residual oil mixture is then hydrogenated to provide a biobased lubricant additive. Alternatively, the mixture is first hydrogenated, then undergoes a separation or series of separations to yield a biobased lubricant additive and other useful products.

Upon testing the compositions by ASTM international radioisotope standard method D6866, the biobased lubricant additives enabled by the present invention can be characterized by a biobased carbon isotope ratio ranging from 50% to 100% by mass, depending on the particulars of the process by which the inventive biobased lubricant additives are made.

The present invention may be more fully understood by reference to the accompanying drawings and figures, in which.

Figure 1:
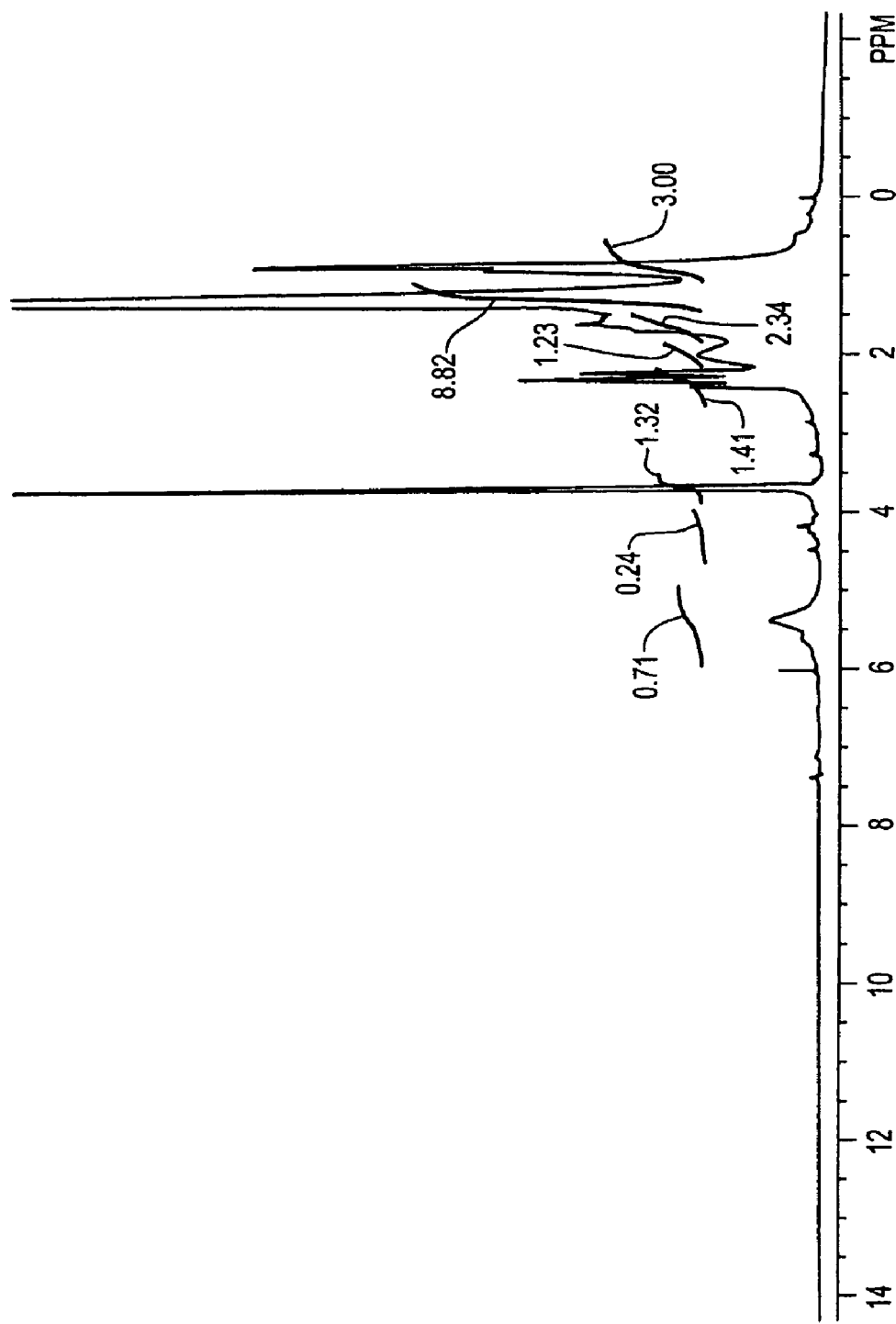
FIG. 1 is an NMR spectrum of one embodiment of a hydrogenated heat-bodied residual oil mixture produced with a process described herein.

Heat-polymerized oils can be chemically treated to make them suitable for use as lubricant additives. Heat-polymerized vegetable oils have been manufactured for many decades, so the process is very well regulated. Thus, heat-bodied oils offer a source of base oils and lubricant additives with consistent, predictable properties. Another advantage is due to the existing industrial capacity for processing vegetable oils including heat polymerization. Heat-polymerized oils modified according to the present disclosure offer a source of good quality lubricant additives which can make up the difference in limited supply and growing demand inherent with petroleum based lubricants and additives. Further, due to the well-understood heat polymerization reaction, the use of base oils and additives from vegetable oils can prevent the difficulties involved in calculating the interchangeability of limited supply petroleum base oils. Even though heat polymerization produces several different cross-linked acylglycerol structures, the resulting mixture is orders of magnitude less complex than the crude petroleum oil starting material used in manufacture of petroleum base oils and additives. Thus, the additives of the present disclosure provide more consistent, more predictable structures, obviating the need for the expensive and sophisticated analysis required with petroleum diesel base oils and additives. Heat-bodied vegetable oils are additionally naturally free of sulfur and nitrogen compounds, providing additives without some of the drawbacks associated with petroleum sources.

Heat polymerized oils, also known as heat-bodied oils, are prepared from unsaturated triacylglycerol oils by holding the temperature between about 288° C. to about 316° C. (depending on the oil) until a product with a desired viscosity is obtained (higher temperatures corresponding to higher viscosities generally). Fish oils are commonly heat polymerized, but linseed, safflower and soybean oils are the unsaturated oils most often used. The viscosity of polymerized oils is quantified using Gardner viscosity on a scale ranging from P to $Z_9$. During the reaction, the unsaturated triglycerides react to form polymers. As polymerization takes place, new carbon-carbon bonds are formed between triglyceride units. The average molecular weight of a starting material, such as soybean oil, is about 780. After heat polymerization, the average molecular weight increases substantially.

One embodiment of a heat-polymerized ("heat-bodied") oil prior to hydrogenation is shown in structure 1:

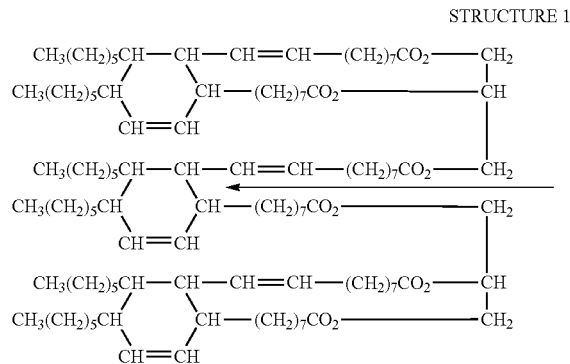

STRUCTURE 1

Structure 1. Structure of heat-bodied oil. John Wiley & Sons, ed., "Drying Oils", Encyclopedia of Polymer Science and Technology 5:216-234, 228 (1966). Two triacylglycerol molecules are crosslinked to each other through bonds formed at former sites of unsaturation of the two triacylglycerol molecules (arrow). In addition, fatty acyl chains are cross-linked to each other within a triacylglycerol molecule.

As can be seen in Structure 1, carbon-carbon bonds or linkages are present between triacylglycerol units of the heat polymerized oil (sample bond indicated by an arrow). These carbon-carbon cross-link bonds are formed from some of the original sites of unsaturation (double bonds, or olefins) in the original triacylglycerol molecules. Some double bonds may remain intact in the heat-polymerized oil. Due to the formation of cross-links between triacylglycerol molecules, the average molecular weight of heat-bodied oil is greater than the average molecular weight of untreated triacylglycerol oil. The heat-bodying process forms cross-links between triacylglycerol molecules and does not form branched chain, fatty acid esters.

The heat polymerization and hydrogenation of linseed oil, a triacylglycerol oil having many sites of unsaturation, is illustrated in Scheme 1:

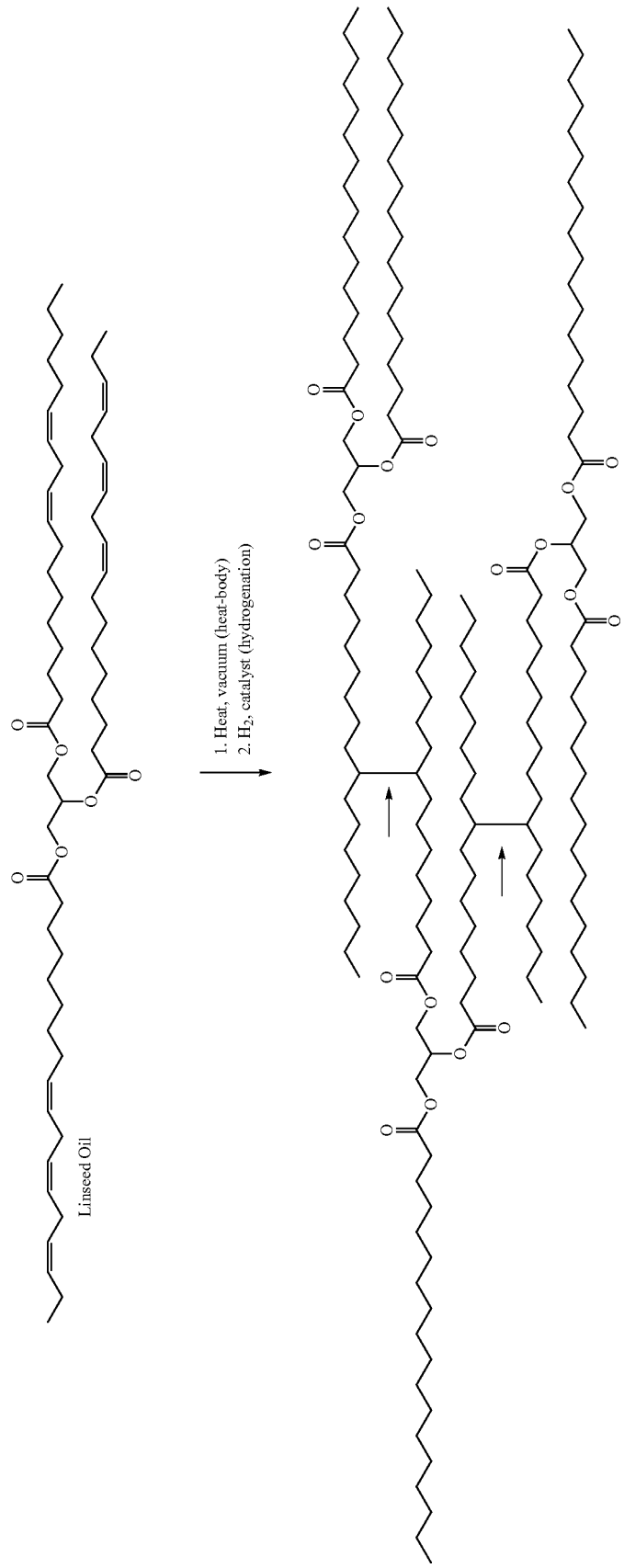

Scheme 1.
Schematic of the heat polymerization and hydrogenation. Linseed oil monomers comprising triacylglycerols are crosslinked through former sites of double bonds. After heat-bodying, hydrogenation is carried out to produce novel molecules suitable for use as base oils and additives. Cross-links between triacylglycerol molecules are indicated by arrows.

As illustrated in Scheme 1, carbon-carbon bonds or linkages are formed between triacylglycerol units of the heat polymerized linseed oil. Some double bonds may remain intact before hydrogenation. Scheme 1 is merely exemplary, and a large number of different cross-linking reactions are possible in the heat bodying (heat-polymerization) reaction. Heat polymerization may form cross-linked dimers, cross-linked trimers and higher cross-linked oligomers of acylglycerol molecules. Hydrogenation of the heat-polymerized oil results in saturation of some or all remaining double bonds, while ester bonds linking the fatty acid moieties to the glycerol may remain intact, as illustrated in Scheme 1. The carbon-carbon linkages that are formed between the triacylglycerol units during heat polymerization processing are not materially affected by hydrogenation of the heat polymerized triacylglycerol oil.

By subjecting heat-bodied vegetable oils to transesterification with biobased alcohols, a fraction comprising 100% biobased ester base oils or 100% biobased ester base oil additives can be obtained, together with a fraction comprising biodiesel, a diesel-like liquid fuel from biological sources made up of lower alkyl esters of fatty acids. In addition, a fraction containing glycerol suitable for conversion to propylene glycol or chemical intermediates can be obtained. Hydrogenation of the remaining alkyl diesters, triesters and polyesters provides a 100% biobased ester lubricant additive fraction. By subjecting heat-bodied vegetable oils to transesterification with petroleum based alcohols, a fraction comprising >50% biobased ester base oils or >50% biobased ester base oil additives can be obtained. Hydrogenation of the alkyl diesters, triesters and polyesters in this case provides a corresponding >50% biobased ester lubricant additive fraction.

Triacylglycerols are biobased molecules obtained from plants, animals, bacteria and other biological sources. Current industrial processes subject triacylglycerols to heating under vacuum in a process known as heat-bodying. During this reaction, polymerization of triacylglycerols takes place by formation of cross-links between triacylglycerols as described in Scheme 1 and as shown in Structure 1. Subsequent to heat-bodying of triacylglycerols such as polymerized triacylglycerols, the cross-linked monomers, cross-linked dimers, cross-linked trimers, higher cross-linked oligomers of acylglycerol molecules are, according to the present invention, reacted with a monohydric or polyhydric alcohol in a transesterification step wherein ester bonds between glycerol and fatty acid moieties are broken and new ester bonds between a monohydric or polyhydric alcohol and fatty acid moieties are formed. The resulting mixture comprising glycerol, free fatty acids, and a combination of esters comprising mono esters, diesters, triesters, and polyesters is in certain embodiments further processed to remove one or more (and, in each case, some or all) of the glycerol, the free fatty acids, and the monoesters from the mixture, to leave a residual oil mixture (residue) comprising at a minimum the diesters, triesters, and polyesters.

The monohydric alcohols or the polyhydric alcohols can be primary, secondary or tertiary alcohols of annular, straight or branched chain compounds. Monohydric alcohols are linear or branched primary or secondary alkanols or alkoxyalkanols having from 1 to 3 carbon atoms. Suitable examples of alkanols include, but are not limited to, methanol, ethanol, propanol, isopropanol, normal butanol, secondary butanol, tertiary butanol, amyl alcohol, isoamyl alcohol, n-pentanol, isopentanol, 2-ethylhexanol, n-hexanol, hexadecyl alcohol or octadecyl alcohol. Suitable alkoxyalkanols are primary or secondary alcohols having from 3 to 12 carbon atoms, wherein a linear, branched, or cyclic alkoxy group having from 1 to 8 carbon atoms is located at a vicinal position to the hydroxyl group. Such alkoxyalkanols are typically derived by opening an alkyl oxirane with an alkanol. Another suitable example of an alkoxyalkanol is tetrahydrofurfuryl alcohol readily accessible via hydrogenation of furfural. Monohydric alcohols are generally thought to be preferable for the inventive process on the basis of their availability, low cost, as well as satisfactory functionality and stability of their esters. The monohydroxyl alcohols can be selected from the group consisting of methyl alcohol, isopropyl alcohol, allyl alcohol, ethanol, propanol, n-butanol, iso-butanol, sec-butanol, tert-butanol, n-pentanol, iso-pentanol, n-hexanol, hexadecyl alcohol, octadecyl alcohol or combinations of any thereof.

Polyhydric alcohols are linear or branched polyhydroxylated alkanes having from 2 to 6 hydroxyl groups. Typical examples are ethylene glycol, propylene 1,2- and 1,3-diols, butylene glycol isomers, glycerol, 1,2,4-trihydroxybutane, pentaerythritol, xylitol, ribitol, sorbitol, mannitol, and galactitol. Polyhydric alcohols may contain one or more ether bonds, and suitable examples of such polyhydric alcohols including, but are not limited to, isosorbide, sorbitan isomers, and diglycerol.

In one exemplary embodiment, methanol is incubated with a heat-bodied oil, thus, carrying out a methanolysis reaction of some or all of the remaining ester bonds in the heat-bodied oil. Heat, pressure, a homogeneous catalyst such as sodium hydroxide or a heterogeneous catalyst, such as ion exchange resins or lipase, may be employed to accelerate the alcoholysis (methanolysis) reaction. Ester bonds between glycerol and fatty acid moieties are broken and new ester bonds between the methanol and fatty acid moieties are formed. The resulting mixture comprises glycerol, free fatty acids, and a combination of methyl esters comprising monoesters, dimethyl esters, trimethyl esters, and polymethyl esters; this mixture is then processed to remove the glycerol, the free fatty acids, and the monomethyl esters from the mixture, leaving a residual oil mixture (residue) comprising dimethyl esters, trimethyl esters, and polymethyl esters. The residual oil mixture is then hydrogenated to provide a biobased lubricant additive composition. The monomethyl esters are suitable for use as biodiesel. The glycerol is suitable for us as a chemical intermediate, such as for conversion to propylene glycol, propane, or chemical intermediates.

In an alternative embodiment as mentioned above, the mixture of glycerol, free fatty acids, and a combination of esters comprising monoesters, diesters, triesters, and polyesters obtained in an alcoholysis reaction is hydrogenated without removing the glycerol, free fatty acids and/or monoesters. Preferably, the hydrogenation involves both the saturation of sites of unsaturation as well as the removal of heteroatoms, including oxygen. Removal of oxygen from the monomeric fatty acid esters, as by decarboxylation, provides a material useful as a diesel fuel; removal of oxygen heteroatoms from the esters of dimer and higher molecular weight compounds by decarboxylation provides a lubricant additive; and the glycerol is converted to 100% biobased propane, providing a useful heating fuel. The resulting product mixture is subjected to one or more separation procedures to recover these various useful products. Suitable separation procedures include, but are not limited to, fractional crystallization, winterization, distillation, liquid-liquid extraction, solvent extraction, distillation, chromatography, and combinations of any thereof.

In another embodiment, alkyl esters of heat bodied oil are separated to yield a distillate comprising biodiesel or a pour point modifier, and a residue. The residue is hydrogenated and subjected to fractional crystallization to yield a lubricant additive or a pour point modifier.

In another option, a lubricant composition is formulated by combining a base oil portion and a biobased lubricant additive portion prepared according to a process of the present invention, to obtain a lubricant composition having a temperature-dependent viscosity profile suitable for use as a motor oil, such as a viscosity ranging from 2 cP at 5° C. to 0.08 cP at 75° C.

The invention is further explained by use of the following illustrative Examples:

EXAMPLE 1

Biobased oil polymerized by heat-bodying (Heat-bodied oil, OKO M2-½, available from Archer-Daniels-Midland Company, Decatur, Ill., 437.5 grams), having a number average molecular weight of 7124 and a polydispersity index of 1.388, was subjected to a transesterification step by refluxing in a round-bottom flask with 90.9 grams of alcohol (anhydrous methanol) and 7.6 mL of catalyst (30% sodium methoxide in methanol).

The reaction mixture was centrifuged at 3000 rpm for 15 minutes and two layers were observed. The bottom layer comprised glycerol and other polar compounds. The top layer comprising alkyl esters of heat-bodied oil was recovered, mixed with 15 grams of silica hydrogel, and filtered with a Whatman #43 filter paper to remove silica. The filtered product comprising alkyl esters of heat-bodied oil was subjected to molecular distillation to separate a distillate fraction comprising traces of glycerol, free fatty acids, and monomeric fatty acid esters from a residue (distilland, residual oil mixture) fraction. The molecular distillation conditions were: temperature of 120° C.; vacuum of 0.001 millibar; wiper setting of 275 rpm; flow rate of 10 mL/min. The residue fraction (residual oil mixture, 159 grams) containing methyl ester dimers, methyl ester trimers and larger methyl ester oligomers (diesters, tri-esters and polyesters) and having an Iodine Value of 100.5 was recovered.

The distillate fraction (187 grams) comprising monoesters (monomeric fatty acid methyl esters, FAME) recovered from the molecular distillation contained a major peak identified as oleic acid methyl ester (29%). The total trans fatty acid content of the distillate fraction was 34%, total C18:1 trans (6%), C18:1 cis (31%), C18:2 trans (1.7%), C18:2 cis (4%) and C18:3 trans (11%) (all results rounded to nearest whole percent value).

EXAMPLE 2

The residual oil mixture fraction from Example 1 comprising methyl esters (diesters, triesters and polyesters) of heat-bodied biobased oil (139 grams) was mixed with 150 mL of petroleum ether in a pressure reactor (Parr). Nickel catalyst (G 96B, Sud Chemie Inc., 0.5 grams) was activated by suspending in 200 ml hexane and activating in a hydrogen purged reactor at 160° C. for about one hour, and hydrogenation of the methyl esters of heat-bodied oil was carried out at 100 psi hydrogen pressure for 7 hours (one hour at 100° C., followed by 6 hours at 160° C.) to obtain hydrogenated residue (alkyl esters of heat-bodied oil) having an iodine value of 78.3. The hydrogenated residue was tested by NMR (EFT, 90 MHz) (FIG. 1). The signals at ~0.8-1.6 ppm and 2.1 ppm in the NMR spectrum are typical of partially hydrogenated esters and correspond to sp3 C—H signals in the fatty main chain. A signal at ~3.5 ppm corresponding to the CH3-O signals from the methyl ester portion of the molecules was observed. A reduced broad signal was present at 4.9-5.5 ppm, corresponding to residual C=C—H signals, the reduction in signal indicating partial hydrogenation.

The Iodine Value (IV) of soybean oil subjected to hydrogenation under the same conditions would drop from ~135 to ~2. An IV drop of only from 100.5 to 78.3 shows the resistance to hydrogenation of the alkyl esters of heat-bodied oil, and indicates the presence of stable or sterically hindered carbon-carbon double bonds in the heat-bodied residue (residual oil mixture, diesters, tri-esters and polyesters) fraction.

EXAMPLE 3

The hydrogenated residual oil mixture fraction (hydrogenated alkyl esters of heat-bodied oil) obtained in Example 2 is subjected to further fractionation by fractional crystallization, winterization, distillation, liquid-liquid extraction, solvent extraction, distillation, chromatography, and combinations of any thereof to provide further fractions of hydrogenated or partially hydrogenated dimer/trimer and higher molecular weight esters (diesters, triesters and polyesters) suitable for use as biobased lubricant components.

EXAMPLE 4

Hydrogenated residue fractions obtained in Example 3 comprising any of hydrogenated dimer/trimer and higher molecular weight esters (diesters, triesters and polyesters) are blended with petroleum based lubricant base stocks as a lubricant component.

EXAMPLE 5

Isoamyl esters of heat-bodied linseed oil were prepared. Heat-bodied linseed oil (OKO M37, available from Archer-Daniels-Midland Company, Decatur, Ill., 450 grams, Iodine Value 113.2) was stirred at 80° C. for 45 minutes in a round-bottom flask with 160 grams of isoamyl alcohol and 7.6 mL of sodium methoxide catalyst (30% sodium methoxide in methanol) to carry out transesterification of glycerol esters of heat-bodied oil to form isoamyl esters.

After transesterification, the reaction mixture was centrifuged at 3000 rpm for 15 minutes and the top layer containing isoamyl esters of heat-bodied oil was recovered from the bottom layer containing glycerol and methanol. Unreacted isoamyl alcohol (62 grams) was removed from the top layer by evaporation under vacuum in a deodorizer. The remaining top layer was mixed with 30 grams of silica hydrogel and the mixture was heated to 120° C. under vacuum and filtered through #43 filter paper to yield a filtered product containing isoamyl esters of heat-bodied oil. The filtered product was subjected to molecular distillation to remove glycerol, free fatty acids, and fatty acid isoamyl esters (monoesters), and an unsaturated liquid monomeric ester distillate fraction (diesters, triesters and polyesters) suitable for use in fuels, lubricants, or as a biobased feedstock for preparation of chemical intermediates was recovered. The molecular distillation conditions were: temperature of 155° C.; vacuum of 0.001 millibar; wiper setting of 275 rpm; flow rate of 10mL/min. A residual oil mixture fraction (195.5 grams) comprising alkyl (isoamyl) diesters, triesters and polyesters of heat-bodied oil (Iodine Value of the esidual oil mixture fraction: 76.6) suitable for use as a biobased ingredient in lubricants was also recovered.

A Group 1 Base Oil (Americas Core 150, BioBlend, Joliet, Ill.) was blended with the residue fraction (isoamyl diesters, triesters and polyesters of heat-bodied oil, labeled Isoamyl Ester Residue) at ratios of base oil to residue fraction of 90:10; 80:20 and 70:30 to form lubricants. Temperature-dependent viscosities profiles of the resulting lubricant compositions at different temperatures were measured with a Brookfield Viscometer, CAP 100 at 900 rpm and compared with the viscosities of the Base Oil and Valvoline 5W-30 (Table 1).

TABLE 1

Temperature-dependent viscosity profiles of Valvoline control, Group 1 Base Oil, and blends of Group 1 Base Oil with Isoamyl Ester residue of heat-bodied oil. Viscosity values are given in centipoise (CP).

| Temp (° C.) | 5W-30 Valvoline | Base Oil AC 150 Group 1 | Viscosity of Base oil:Isoamyl Ester Residue (4459-0197) | | |
|---|---|---|---|---|---|
| | | | 90:10 | 80:20 | 70:30 |
| 5 C. | 2.025 | 1.117 | 1.725 | 2.204 | 3.154 |
| 15 C. | 1.238 | 1.646 | 1.025 | 1.408 | 1.554 |
| 25 C. | 0.475 | 0.329 | 0.317 | 0.475 | 0.708 |
| 35 C. | 0.454 | 0.279 | 0.258 | 0.508 | 0.496 |
| 45 C. | 0.213 | 0.096 | 0.171 | 0.246 | 0.358 |
| 55 C. | 0.254 | 0.082 | 0.142 | 0.154 | 0.178 |
| 65 C. | 0.15 | 0.067 | 0.054 | 0.096 | 0.133 |
| 75 C. | 0.079 | 0.042 | 0.021 | 0.054 | 0.071 |

The temperature-dependent viscosity of a blend of 20% isoamyl ester residue of heat-bodied oil with Group 1 Base Oil (80%) matched the temperature-dependent viscosity profile of the Valvoline 5W-30 (Table 1). Thus, the isoamyl diesters, triesters and polyesters of heat-bodied oil provided a 100% biobased lubricant additive.

EXAMPLE 6

The residual oil mixture fraction from Example 5 containing isoamyl esters of heat-bodied oil (di-esters, tri-esters and poly-esters) is hydrotreated. In the hydrotreatment, ester linkages are reduced and oxygen is removed to produce a lubricant component that is 100% biobased carbon depleted in oxygen. The unsaturated liquid monomeric fatty acid alkyl ester fraction (distillate fraction) is hydrotreated to reduce ester linkages, producing a fuel that is 100% biobased carbon depleted of oxygen. The hydrotreatment is expected to remove ester linkages and heteroatoms, including oxygen, by decarboxylation of esters/acids, to make a 100% biobased lubricant additive. The lack of ester linkages in these compounds is expected to provide a stable product resistant to hydrolytic breakdown, suitable for biobased diesel fuel (green diesel).

EXAMPLE 7

Figure 2:
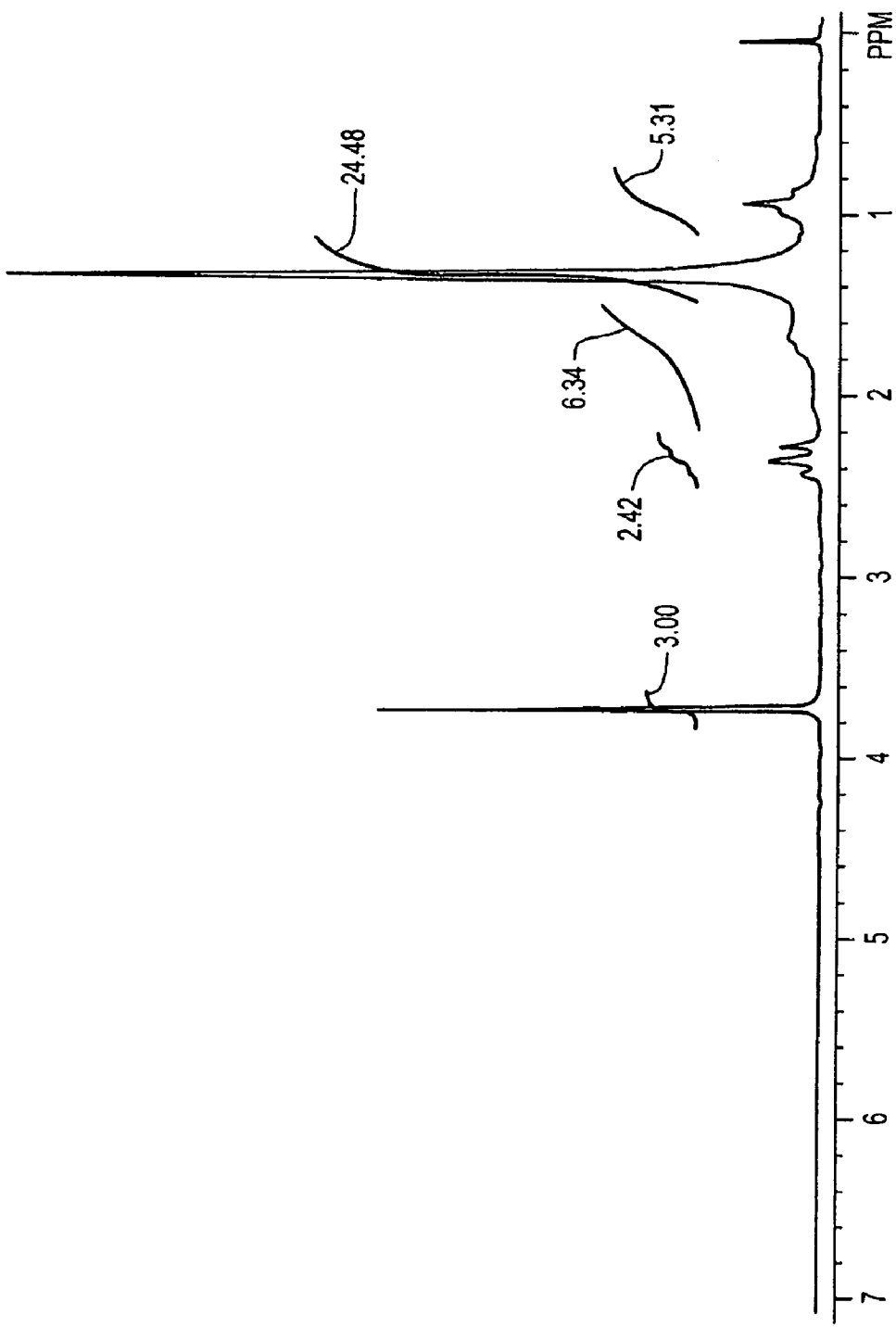
FIG. 2 is an NMR spectrum of one embodiment of hydrogenated Alinco Y methyl esters produced with a process described herein.
Figure 3:
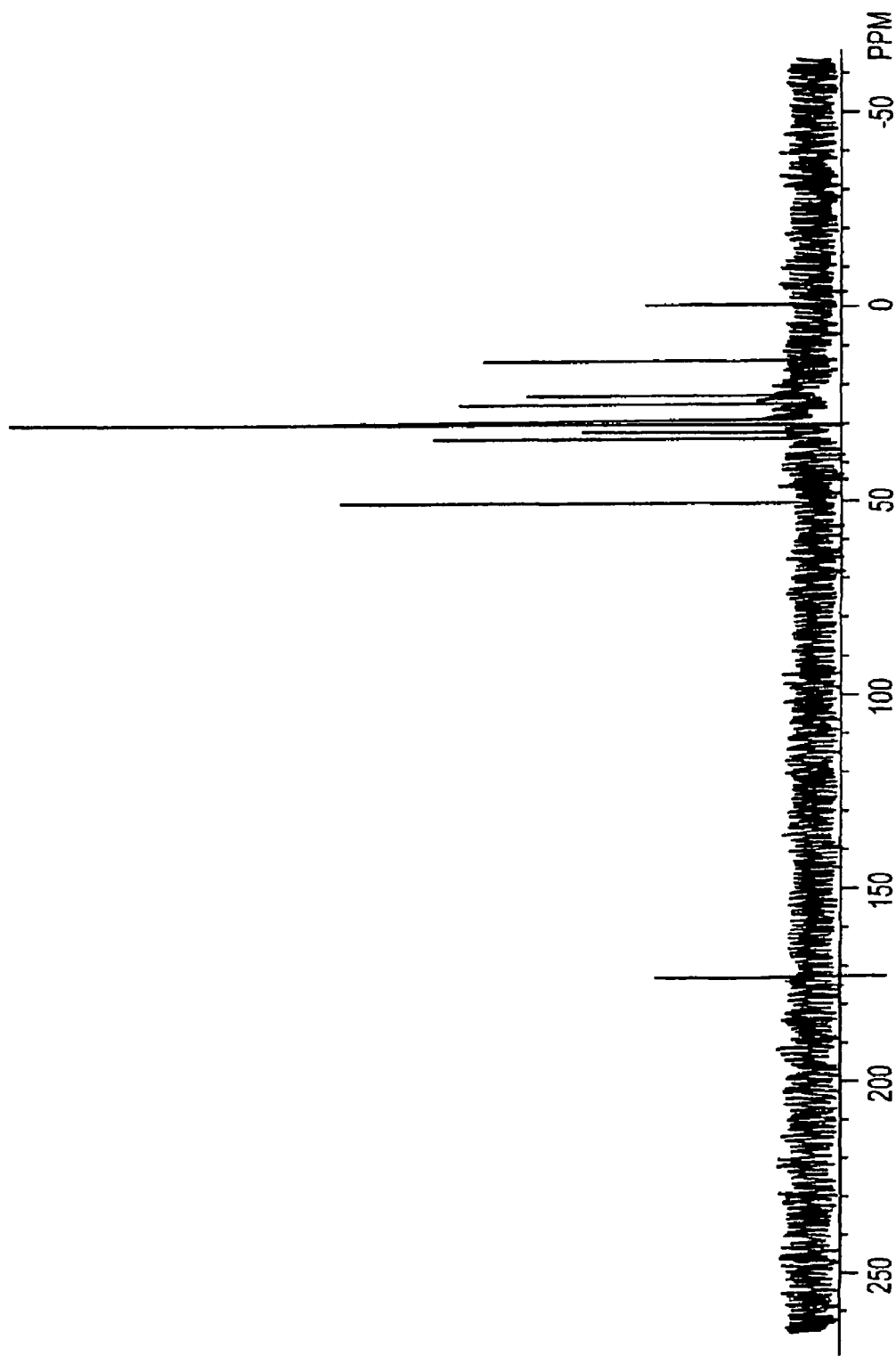
FIG. 3 is an NMR spectrum of one embodiment of hydrogenated Alinco Y methyl esters produced with a process described herein.

Biobased oil polymerized by heat-bodying (Heat-bodied oil, Alinco Y, available from Archer-Daniels-Midland Company, Decatur, Ill.) having a weight average molecular weight of 4,491 and a polydispersity index of 1.251 was treated with sodium methoxide and methanol to conduct methanolysis, centrifuged and filtered substantially as described in Example 1 to produce methyl esters of heat-bodied (polymerized) oil. Glycerol and methanol were removed in a lower layer. The remaining product mixture was subjected to hydrogenation under 1000 psi hydrogen pressure substantially as described in Example 2 using a pre-activated catalyst until hydrogen saturation was reached (about 4 hours) as evidenced by the lack of further uptake of hydrogen. The hydrogenated mixture of Alinco Y methyl esters and fatty acid methyl esters was subjected to NMR analysis (FIGS. 2 and 3). FIG. 2 suggests that the methyl ester functionalities were not affected (reduced) by the hydrogenation process. The protons at 2.2-2.4 ppm represent the alpha position to the ester, further suggesting that this sample contains ester groups. The large peak at 1.2-1.6 ppm represents the long alkyl chain (fatty main chain). The lack of proton peaks from 5-7 ppm indicates an undetectable level of unsaturation. The C13 spectrum indicates the presence of the C=O moiety by the presence of the ester peak at ~175 ppm (FIG. 3). This hydrogenated mixture of Alinco Y methyl esters (di-esters, tri-esters, and poly-esters) and fatty acid methyl esters (mono-esters) is expected to be a useful biobased oxidation-resistant lubricant additive due to the low level of unsaturation.

EXAMPLE 8

Figure 4:
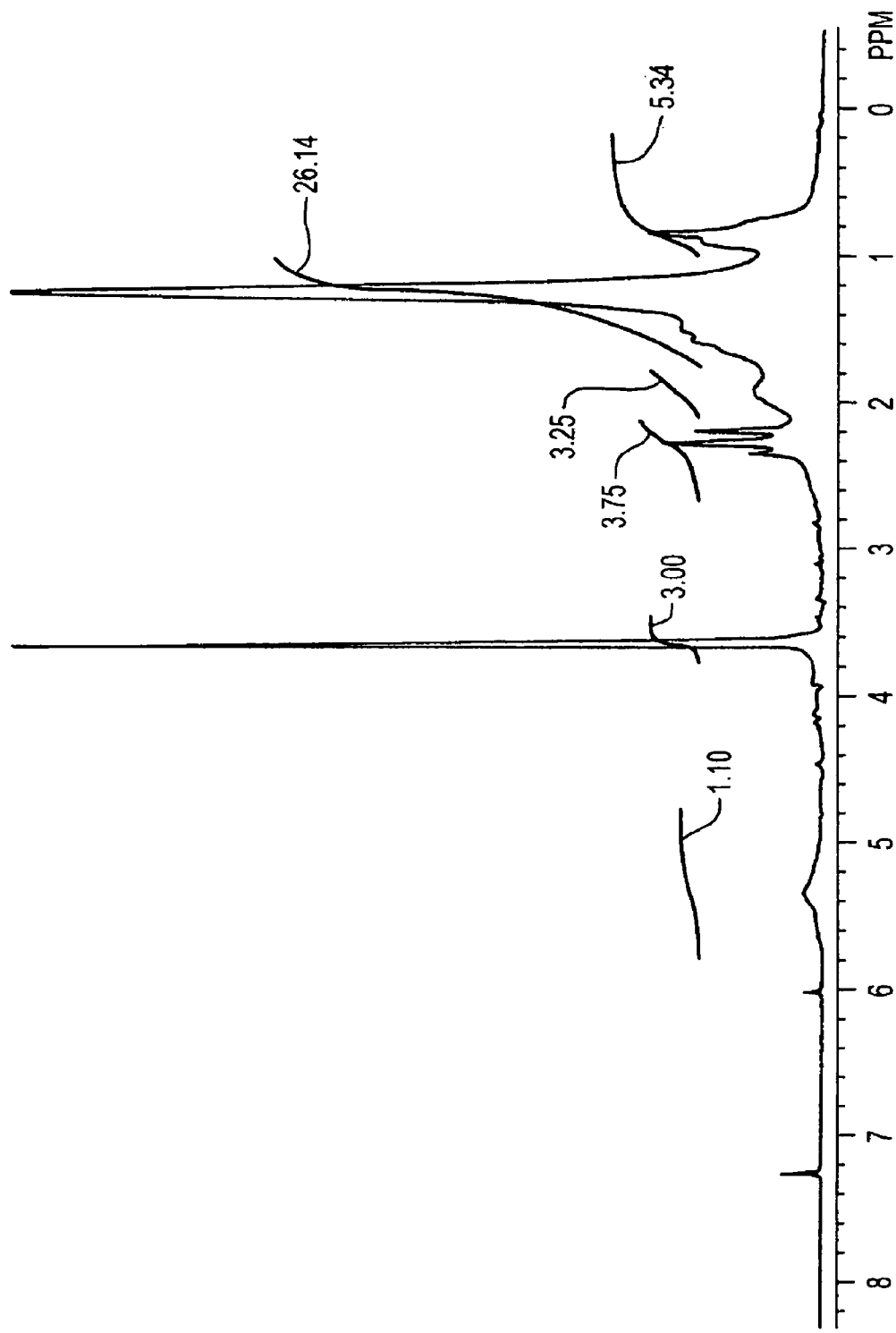
FIG. 4 is an NMR spectrum of one embodiment of a hydrogenated residual oil mixture of methyl esters of heat-bodied oil produced with a process described herein.
Figure 5:
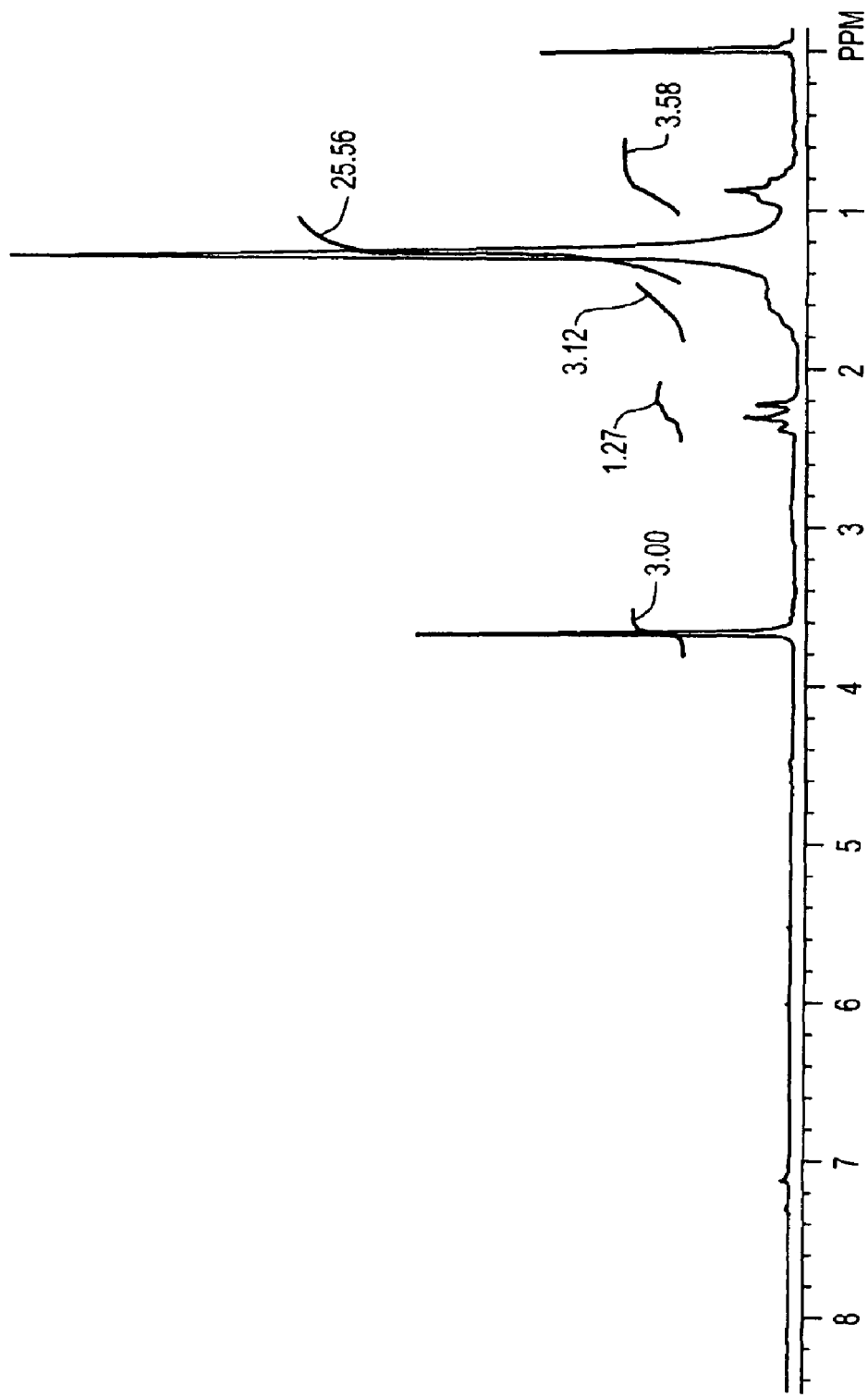
FIG. 5 is an NMR spectrum of the liquid phase of one embodiment of fractionated hydrogenated methyl esters of heat-bodied oil produced with a process described herein.

Methyl esters of biobased oil polymerized by heat bodying (OKO M37) were prepared and separated substantially as described in Example 1. The residue was hydrogenated at 190° C. for 8 hours over G69B Sud Chemie catalyst substantially as described in Example 2. The hydrogenated residue of OKO M37 methyl ester of heat bodied oil (residual oil mixture) was filtered twice to provide a product was light in color and a viscous liquid at room temperature. NMR analysis showed decreased double bonds in the filtered hydrogenated OKO M37 methyl ester residual oil mixture (FIG. 4). The iodine value of the product was determined by titration in duplicate to be 74.10. The temperature-dependent viscosity profile of the filtered hydrogenated OKO M37 methyl ester residual oil mixture was tested in a water-jacketed Brookfield viscometer at various temperatures and 30 rpm (Table 2).

TABLE 2

Temperature-dependent viscosity profile of hydrogenated residual oil mixture of methyl esters of heat-bodied oil (labeled methyl ester-dimer, 4459-195). Viscosity values are given in centipoise (CP).

| Temperature (° C.) | Viscosity (cP, 30 rpm) |
|---|---|
| 25 | 416 |
| 80 | 35 |
| 93 | 24 |

A Group 1 petroleum Base Oil, Americas Core 150 from BioBlend, was blended with the product of example 8 at ratios of base oil: hydrogenated OKO M37 methyl ester residue (residual oil mixture) of 90:10; 80:20 and 70:30. The temperature-dependent viscosity profiles were measured with a Brookfield Viscometer CAP 100 at 900 rpm and compared with the Base Oil and Valvoline 5W-30 (Table 4).

TABLE 3

Temperature-dependent viscosity profile of blends of Base Oil and hydrogenated OKO M37 methyl ester residual oil mixture. Hydrogenated OKO M37 methyl ester residue (residual oil mixture, di-esters, tri-esters and poly-esters) is labeled "Residual oil mixture". Viscosity values are given in centipoise (CP).

| Temp ° C. | Valvoline 5W-30 | Base Oil AC 150 Group 1 | Viscosity of Base oil:Residual oil mixture (4459-0195) | | |
|---|---|---|---|---|---|
| | | | 90:10 | 80:20 | 70:30 |
| 5 C. | 2.025 | 1.117 | 1.546 | 1.783 | 1.917 |
| 15 C. | 1.238 | 0.646 | 1.075 | 1.083 | 1.396 |

TABLE 3-continued

Temperature-dependent viscosity profile of blends of Base Oil and hydrogenated OKO M37 methyl ester residual oil mixture. Hydrogenated OKO M37 methyl ester residue (residual oil mixture, di-esters, tri-esters and poly-esters) is labeled "Residual oil mixture". Viscosity values are given in centipoise (CP).

| Temp °C. | Valvoline 5W-30 | Base Oil AC 150 Group 1 | Viscosity of Base oil:Residual oil mixture (4459-0195) 90:10 | 80:20 | 70:30 |
|---|---|---|---|---|---|
| 25 C. | 0.475 | 0.329 | 0.342 | 0.438 | 0.554 |
| 35 C. | 0.454 | 0.279 | 0.271 | 0.313 | 0.421 |
| 45 C. | 0.213 | 0.096 | 0.158 | 0.167 | 0.192 |
| 55 C. | 0.254 | 0.082 | 0.129 | 0.113 | 0.188 |
| 65 C. | 0.15 | 0.067 | 0.079 | 0.113 | 0.1 |
| 75 C. | 0.079 | 0.042 | 0.058 | 0.071 | 0.083 |

The temperature-dependent viscosity profile of Base Oil containing 30% residual oil mixture (70:30 blend of base oil and Example 8 product) closely matched the temperature-dependent viscosity profile of the Valvoline 5W-30. Thus, the base oil containing 30% residual oil mixture had a temperature-dependent viscosity profile suitable for use as a motor oil Base Oil containing 30% residual oil mixture (70:30 blend of base oil and Example 8 product, labeled Lubricant-2 07-1374-2C) was subjected to testing by test method ASTM D-5183 to determine the Coefficient of Friction together with the Base Oil Americas Core 150 (Table 4).

TABLE 4

Coefficient of friction, incipient seizure load, and wear-in scars results of Base Oil and a blend of Base Oil with hydrogenated methyl ester residue (residual oil mixture) of heat-bodied oil.

| Weight (kg) | Base Oil Coefficient of friction | 70:30 blend of base oil and residual oil mixture Coefficient of friction |
|---|---|---|
| 10 | 0.112 | 0.0544 |
| 20 | 0.1427 | 0.0646 |
| 30 | 0.1291 | 0.0719 |
| 40 | 0.1227 | 0.0739 |
| 50 | 0.1169 | 0.0747 |
| 60 | 0.1144* | 0.0736 |
| 70 |  | 0.0716 |
| 80 |  | 0.0745 |
| 90 |  | 0.0687 |
| 100 |  | 0.0708 |
| 110 |  | 0.0772 |
| 120 |  | 0.0725 |
| Incipient seizure load (kg) | 40 | 90 |
| Average wear-in scar (mm) | 0.64 | 0.64 |
| Final average wear-in scar (mm) | 0.67 | 0.67 |

*test terminated

These results clearly indicate the usefulness of hydrogenated OKO M37 methyl ester residual oil mixture as a biobased lubricant component or lubricant additive.

EXAMPLE 9

Hydrogenated methyl esters of biobased oil polymerized by heat-bodying (heat-bodied oil, OKO M2-1/2, available from Archer-Daniels-Midland Company, Decatur, Ill.) were subjected to alcoholysis (methyl esterification) and molecular distillation substantially as described in Example 1. The resulting methyl esters of dimer and higher molecular weight compounds were subjected to hydrogenation substantially as described in Example 2 to yield a hydrogenated residue comprising hydrogenated methyl esters of heat-bodied OKO M2-1/2. The hydrogenated methyl esters of heat-bodied OKO M2-1/2 were subjected to fractional crystallization by incubating overnight in a laboratory freezer at a temperature of −30° C. The fractionally crystallized product was filtered and the liquid fraction was tested by NMR. The NMR spectrum confirmed that there were very few remaining double bonds in the fraction. The iodine value of the liquid fraction of fractionated hydrogenated methyl diesters, triesters and polyesters of heat-bodied OKO M2-1/2 was determined by titration to be 25.2. This biobased liquid fraction is expected to be a useful oxidation-resistant lubricant additive due to the low iodine value.

EXAMPLE 10

Heat-bodied oil is subjected to alcoholysis (transesterification) to prepare alkyl esters substantially as described in Example 1. The entire resulting product is subjected to hydrotreating substantially as described in Example 15, which has three effects: heteroatoms, including oxygen, are removed from monomeric fatty acid esters by decarboxylation, providing a diesel fuel; heteroatoms, including oxygen, are removed from esters of dimer and higher molecular weight compounds by decarboxylation, providing a lubricant additive; and the glycerol is converted to 100% biobased propane, providing a useful heating fuel.

EXAMPLE 11

The hydrotreated product mixture obtained in Example 10 is subjected to a separation procedure. The propane is recovered from the hydrotreated product mixture to yield 100% biobased propane and further separation is carried out to obtain a biobased diesel fraction enriched in hydrocarbons containing predominantly 15 to 17 carbon atoms (C-15 to C-17 fraction) from the monomeric acid residue and a lubricant fraction from the dimer/trimer and higher fatty acid moieties.

EXAMPLE 12

Heat-bodied oil is subjected to alcoholysis (transesterification) to prepare esters followed by molecular distillation substantially as described in Example 1. The resulting distillate and residual oil mixture fractions are separately subjected to hydrotreating substantially as described in Example 16 to produce a diesel fuel enriched in hydrocarbons containing predominantly 15 to 17 carbon atoms (C-15 to C-17 fraction) from the monomeric acid distillate and to produce lubricant fractions from the di-ester, tri-ester and poly-ester moieties of the residue. The hydrotreatment removes ester linkages and heteroatoms, including oxygen, by decarboxylation of esters/acids, to make a biobased green diesel fuel and lubricant additives.

EXAMPLE 13

Feedstock or product is subjected to deodorization (stripping) substantially as described in U.S. Patent Application Publication No. 2005/0014237 A1 to remove volatile compounds for other chemical or fuel applications to improve the quality of products or feedstocks for diesel fuel and lubricant applications.

EXAMPLE 14

Hydrotreated or transesterified polymerized oil compounds are used as biobased pour point depressants in diesel, green diesel, or biodiesel formulations.

EXAMPLE 15

Alkyl esters of OKO M37 were prepared substantially as described in Example 1 and a residual oil mixture was recovered substantially as described in Example 2. The residue fraction of alkyl ester of heat bodied oil (110 grams, weight average molecular weight of 4,296 Da and polydispersity index of 1.693) was combined with di-t-butyl-disulfide (2.0 grams) and dissolved in sufficient hexanes to bring the volume to 250 ml, providing a feed solution of 44% (w/v) methyl ester residual oil mixture of OKO M37.

The feed solution was hydrotreated as follows: feed solution was pumped at 0.5 ml/minute into a stainless steel fixed-bed continuous hydrotreating reactor (Autoclave Engineers, a division of Snap-Tite, Inc., Erie, Pa.) having an internal diameter of 0.52 inches and a hot zone of 12 inches long (total tube length, 17 inches) packed with HDmax 300 catalyst (Sud-Chemie, Inc., Louisville, Ky.). Prior to use, the catalyst was pretreated by passing a hexane solution of di-t-butyl-disulfide (sulphur content=1% w/v) through the catalyst bed at 1 ml/minute at 250° C. for two hours at 500-550 psi hydrogen pressure; after two hours the temperature was increased to 350° C. in 25-50 degree increments, and held for two hours at 350° C. Hydrotreatment of OKO M37 methyl ester residual oil mixture was carried out at a reactor temperature of 350° C. (monitored and controlled via an internal thermocouple), 1000 psi hydrogen pressure and a liquid hourly space velocity (LHSV) of 1/hr. Hydrotreated methyl ester residual oil mixture of OKO M37 was collected and heated to remove hexane and titrated for Iodine Value and analyzed by 90 Mhz proton NMR spectroscopy (Anasazi Instruments, Indianapolis, Ind.).

The Iodine Value of the hydrotreated methyl ester residual oil mixture of OKO M37 was 55.9. The relative peak areas of the spectra were used to determine the relative number of protons in different chemical environments in the molecule (Table 5). The terminal methyl groups of hydrocarbon chains were assigned an area of 3.00, and the other values were determined relative to that signal. In the table, "ester CH3" represents the area of the NMR signal from the methyl ester methyl group. "CH2 by ester" is the signal from the protons on the methylene carbon adjacent to the carbon which is linked via oxygen to the ester CH3.

TABLE 5

Proton NMR signals of methyl esters of heat-bodied oil before and after hydrotreatment.

| | Methyl esters of OKO M37 | Hydrotreated methyl esters of OKO M37 (4867-048-03) |
|---|---|---|
| Terminal methyl | 3.00 | 3.00 |
| Ester CH3 | 1.55 | 0.31 |
| CH2 adjacent to ester-linked carbons | 1.70 | 0.73 |

The decrease in peak intensity of proton NMR signals from ester methyl (Ester CH3) groups and methylene groups adjacent to ester-linked carbons clearly indicate the removal of oxygen from the methyl esters of OKO M37 by hydrotreating to form biobased components suitable for lubricant additives.

EXAMPLE 16

Dimer fatty acid (Empol 1012, Cognis Corporation, Cincinnati, Ohio) (100 grams) and di-t-butyl-disulfide (1.5 grams) were dissolved in sufficient hexanes to bring the volume to 250 ml, providing a feed solution of 40% (w/v) dimer fatty acid. Using the reactor apparatus and conditions substantially as described in Example 15, the feed solution was hydrotreated. Hydrotreated dimer fatty acid product was collected and heated to remove hexane. Samples of Empol 1012 and 4867-056-02 (a dehexanated product of the reaction) were analyzed for carbon and hydrogen as described in Example 15 and the oxygen content was obtained by difference (Table 6).

TABLE 6

Elemental composition of dimer fatty acids before and after hydrotreating. All values are weight percentages.

| | Empol 1012 dimer fatty acid | Hydrotreated dimer fatty acid product (4867-056-02) |
|---|---|---|
| Carbon | 76.79 | 82.84 |
| Hydrogen | 11.74 | 13.53 |
| Oxygen (by difference) | 11.37 | 3.63 |

Hydrotreatment was effective in reducing the oxygen content of the material by 68.1%, based on raw material values, to form 100% biobased components suitable for lubricant additives.

EXAMPLE 17

Polymerized fatty acid (Pripol 1040, Uniqema, Wilton, Redcar, UK) (58 grams) was dissolved in hexanes to make 150 mL solution (39% w/v). The reactor apparatus described in Example 15 was loaded with 15.53 grams 2% palladium on granular carbon catalyst (H5100, Engelhard Corporation, Iselin, N.J.). The catalyst was reduced in flowing hydrogen gas at atmospheric pressure at 200° C. for two hours. Polymerized fatty acid in hexanes feed solution was added at 0.5 mL/min. Reactor conditions were 325° C., 615 psig hydrogen. NMR analyses of Pripol 1040 and the reaction product 4867-062-01 were performed as described in Example 15. The relative peak areas of the spectra were used to determine the relative number of protons in different chemical environments in the molecule (Table 7). The terminal methyl groups of hydrocarbon chains were assigned an area of 3.00 and the other values were determined relative to that signal. In the table, "acid proton" represents the relative area of the carboxylic acid proton peak. "CH2 by acid" is the signal from the protons on the methylene carbon adjacent to the carboxylic acid group.

TABLE 7

Proton NMR signals of polymerized fatty acids before and after hydrotreatment.

| | Pripol 1040 | Hydrotreated Pripol 1040 (4867-062-01) |
|---|---|---|
| Terminal methyl | 3.00 | 3.00 |
| Acid proton | 0.34 | Not detected |
| CH2 by acid | 1.73 | 0.44 |

The decrease in peak intensity of proton NMR signals from the methylene group adjacent to the carboxylic acid group, and a non-detectible signal from the carboxylic acid proton clearly indicate the removal of oxygen from Pripol 1040 polymerized fatty acids by hydrotreating. Samples of Pripol 1040 and hydrotreated Pripol 1040 4867-058-02 (a dehexanated product of the reaction) were analyzed for carbon and hydrogen as described in Example 15 and the oxygen content was obtained by difference.

TABLE 8

Elemental composition of polymerized fatty acids before and after hydrotreating. All values are weight percentages.

|  | Pripol 1040 | Hydrotreated Pripol 1040 (4867-058-02) |
| --- | --- | --- |
| Carbon | 77.13 | 79.57 |
| Hydrogen | 11.42 | 12.49 |
| Oxygen (by difference) | 11.45 | 7.94 |

Hydrotreatment was effective in reducing the oxygen content of the material by 30.6%, based on raw material values, to form 100% biobased compounds suitable for lubricant additives.

EXAMPLE 18

Figure 6:
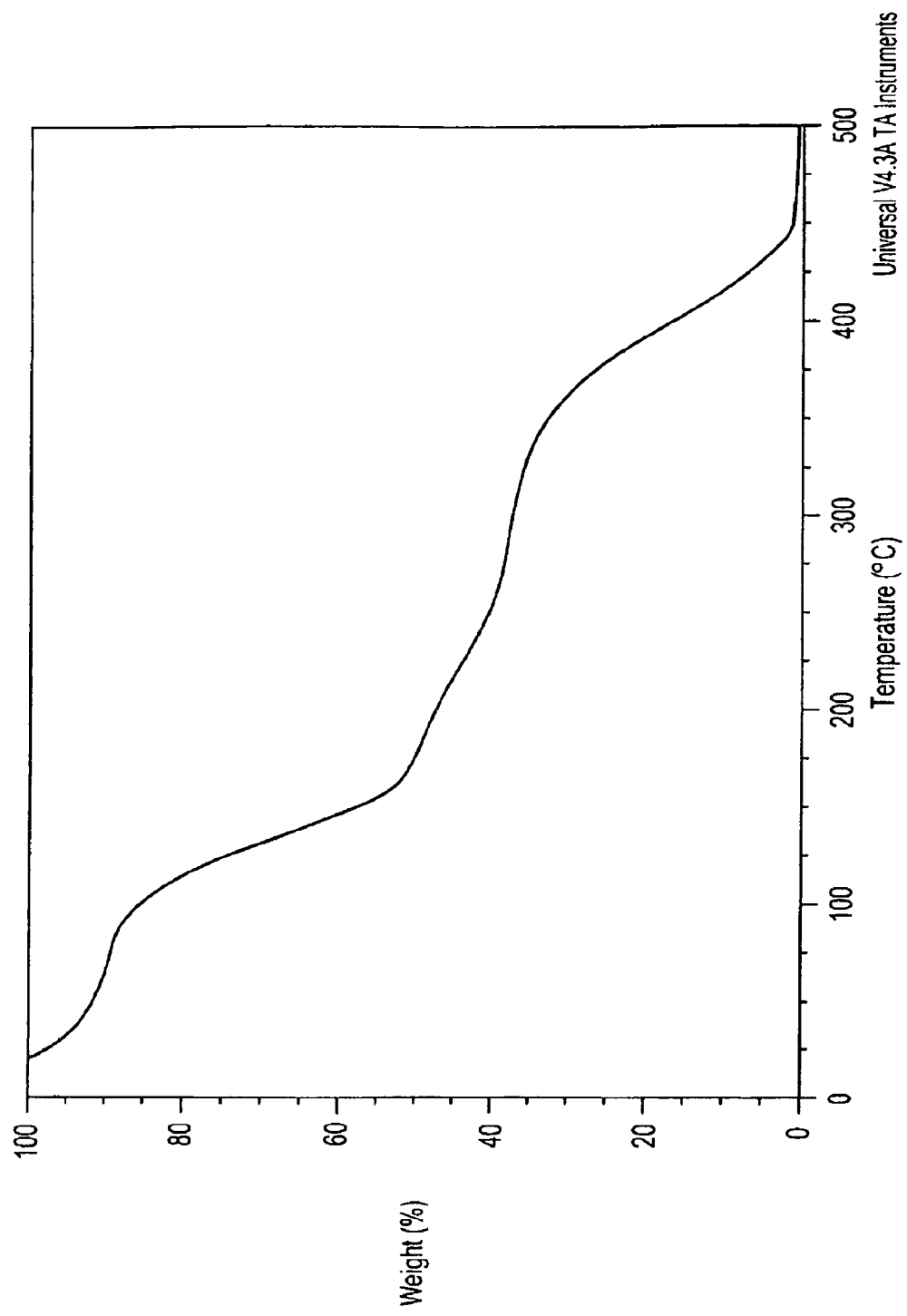
FIG. 6 is a thermogravimetric analysis trace of one embodiment of a hydrogenated heat-bodied oil produced with a process described herein.

OKO M 7.5 heat bodied oil (51.70 g, available from Archer-Daniels-Midland Company, Decatur Ill.) was combined with 1.0 g di-t-butyl-disulfide, brought to 250 mL with isooctane and subjected to hydrotreating substantially as described in Example 15, except that the catalyst bed temperature was 300° C. and the hydrogen pressure was 600 psi hydrogen. The hydrotreated heat-bodied oil was subjected to fractionation by incubation at room temperature to form a gel fraction and a liquid fraction. The biobased liquid fraction was subjected to Thermogravimetric Analysis using a TGA Q500 V 6.6 Thermogravimetric Analyzer (Universal V4.3a) from TA Instruments. Thermogravimetric Analysis showed the presence of compounds boiling between 150 and 300° C. and compounds boiling between 350 and 450° C. (FIG. 6). The liquid fraction and a reference diesel fuel sample were subjected to Simulated Distillation with a gas chromatograph. Simulated distillation indicated similarity in structure and boiling point between the reference diesel fuel sample and the liquid fraction (FIG. 7). Predominant peaks in the diesel sample were visible near 13.5, 15.4, 17, 18.4, 19.7, 20.9, and 22.1 minutes; corresponding major peaks in the hydrotreated heat bodied oil were visible near 18.4, 19.7, 20.9, and 22.1 minutes.

The heat stability of the gel fraction was tested by heating the gel fraction to 300° C. The gel fraction did not char or decompose, indicating the formation of a biobased heat-stable gel suitable for use in high-temperature greases.

The invention claimed is:

1. A process for producing a biobased lubricant additive, the process comprising: transesterifying a biobased polymerized oil with an alcohol to produce a mixture including glycerol, free fatty acids, and a residual oil mixture of monoesters, diesters, triesters and polyesters; removing some or all of the glycerol, free fatty acids and monoesters; and hydrogenating the remainder to provide a biobased lubricant additive.

2. The process of claim 1, wherein the hydrogenation step includes both saturating sites of unsaturation as well as removal of oxygen heteroatoms.

3. The process of claims 1 or 2, wherein the biobased polymerized oil is reacted with one or more biobased alcohols to provide a remainder which when hydrogenated provides a biobased lubricant additive having a biobased carbon isotope ratio according to ASTM D6866 from 50 to 100% by mass.

4. The process of claim 3, wherein the biobased lubricant additive is characterized by a biobased carbon isotope ratio of 100% by mass.

5. The process of claims 1 or 2, wherein the biobased polymerized oil is reacted with one or more petroleum based alcohols to provide a remainder which when hydrogenated provides a biobased lubricant additive having a biobased carbon isotope ratio according to ASTM. D6866 of at least 50% by mass.

6. The process of claim 1, wherein glycerol is removed and is subsequently converted to products including a biobased propylene glycol or propane.

7. The process of claim 1, wherein the transesterification of the biobased polymerized oil with an alcohol provides one or more lower alkyl monoesters of fatty acids which are removed and subsequently included in or used for a diesel fuel.

8. The process of claims 1 or 2, wherein the remainder before hydrogenation is characterized by an iodine value of 25 to 110.

9. The process of claims 1 or 2, further comprising separating out a liquid fraction, comprising an oxidation-resistant lubricant additive, from the hydrogenated remainder.

10. The process of claim 9, wherein the separation is accomplished by one or more of fractional crystallization, winterization, distillation, liquid-liquid extraction, solvent extraction, distillation and chromatography.

11. The process of claim 10, wherein the resulting oxidation-resistant lubricant additive is characterized by an iodine value below 30.

12. A process for producing a biobased lubricant additive, the process comprising: transesterifying a biobased polymerized oil with an alcohol to produce a mixture including glycerol, free fatty acids, and a residual oil mixture of monoesters, diesters, triesters and polyesters; hydrogenating the mixture to provide a biobased lubricant additive fraction and other useful products including monomeric fatty acid alkyl esters suited for use in or as a diesel fuel and biobased propane from glycerol produced in the transesterification step; and, separating out the monomeric fatty acid alkyl esters and propane products from the biobased lubricant additive fraction.

13. A lubricant composition comprising:
    a base oil portion; and
    a biobased lubricant additive portion including a biobased lubricant additive as made by
    any of claims 1-2, 6-7, or 12,
wherein the lubricant composition has a temperature-dependent viscosity profile ranging from 2 cP at 5 degrees Celsius to 0.08 cP at 75 degrees Celsius.

14. The lubricant composition of claim 13, wherein the ratio of the base oil portion to the biobased lubricant additive portion is in the range of from 65:35 to 85:15 by weight.

15. The lubricant composition of claim 13, wherein the ratio of the base oil portion to the biobased lubricant additive portion is in the range of from 70:30 to 80:20 by weight.

* * * * *